United States Patent

Watanabe et al.

[15] 3,687,027

[45] Aug. 29, 1972

[54] EXPOSURE CONTROL CIRCUITRY FOR USE IN PHOTOGRAPHIC CAMERA

[72] Inventors: Minoru Watanabe; Masao Takayama, both of Tokyo, Japan

[73] Assignee: Kabushiki Kaisha Koparu, Tokyo-to, Japan

[22] Filed: Oct. 23, 1970

[21] Appl. No.: 83,456

[30] Foreign Application Priority Data

Oct. 31, 1969 Japan ....................44/103492

[52] U.S. Cl. ................................................95/10 CT

[51] Int. Cl. ................................................G01j 1/46

[58] Field of Search ...............95/10 CT, 10 CE, 10 C

[56] References Cited

UNITED STATES PATENTS 3,326,103 6/1967 Topaz......................95/10 CT 3,418,904 12/1968 Wick.......................95/10 CT 3,063,354 11/1962 Matulik...................95/10 CT 3,245,332 4/1966 Kagan......................95/10 CT

*Primary Examiner*—Samuel S. Matthews

*Assistant Examiner*—Monroe H. Hayes

*Attorney*—Cushman, Darby & Cushman

[57] ABSTRACT

An auxiliary time circuit comprising auxiliary resistors connected in series with an auxiliary capacitor is connected, in parallel, with a main time circuit comprising a photoconductive element, such as Cds, connected in series with a photometric or main capacitor. These main and auxiliary time circuits are connected, via separate diodes, respectively, with a transistorized switching circuit containing therein an electromagnet for controlling the shutter. With this arrangement, an exposure time range beyond the predetermined time range can be regulated by said auxiliary time circuit.

4 Claims, 3 Drawing Figures

Patented Aug. 29, 1972 3,687,027

Minoru Watanabe
Masao Takayama
INVENTORS

BY

Cushman, Darby & Cushman
ATTORNEYS

Minoru Watanabe
Masao Takayama
INVENTORS

BY

Cushman, Darby & Cushman
ATTORNEYS

EXPOSURE CONTROL CIRCUITRY FOR USE IN PHOTOGRAPHIC CAMERA

BACKGROUND OF THE INVENTION

1. Field of the Invention:

The present invention is concerned with an improvement in exposure control circuitry for use in photographic cameras, and more particularly, it relates to an exposure control circuitry which is arranged so that the maximum length of exposure time is determined, independently of the brightness of the object to be photographed, by an auxiliary time circuit.

2. Description of the Prior Art:

An exposure control circuitry of the type described comprises, in general, a time circuit which is composed of a photoconductive element, such as Cds and a capacitor connected in series with said photoconductive element, a transistorized switching circuit connected to this time circuit, and an electromagnet for controlling the closing action of the shutter blades connected to the output terminal of said switching circuit. By virtue of this arrangement, the exposure control circuitry is enabled to determine the exposure time in such a way as to comply with the intensity of the brightness of the object to be photographed whenever this brightness is of the order as is encountered ordinarily.

Under a certain condition, however, in which the intensity of brightness of the object to be photographed is very low, the photoconductive element is rendered to the state of having a very great resistance value. Therefore, the leakage current from the capacitor affects the exposure time to such an extent as may not be ignored. More specifically, the time constant — which is the product of the resistance value of the photoconductive element and the value of the capacity of the capacitor — virtually exceeds the predetermined value, resulting in an over-exposure photography. Thus, in the instance where the brightness of the object to be photographed is very low in intensity as stated above, there will arise the anxiety that the charge voltage of the capacitor might fail to gain the magnitude sufficient for actuating the switching transistor or that this action of the switching transistor might cease temporarily — even when the switching transistor is actuated — because said transistor is not provided with enough base current for retaining the same in its actuated state. In such an instance, there arises the inconvenience that the shutter blades are not closed but are kept open.

The manner in which the increase in the resistance value of the photoconductive element brings forth such an undesirable effect as described above can vary depending on the layout of the circuitry and the type of the component members. However, such an ill effect will take place when a time constant of a large value corresponding to a prolonged exposure time of, for example, 30 seconds or more is provided. Accordingly, in order to eliminate the aforesaid drawbacks, it is mandatory to arrange so that no unusually large time constant be produced independently of the intensity of brightness of the object to be photographed. To this end, it is desirable to restrict the range of exposure time so as to lie within 30 seconds.

In the past, a time constant which is substantially not related to the brightness of the object to be photographed was determined by utilizing the arrangement in which a fixed resistor $R_1$ is connected in parallel with the photoconductive element $P_1$ as shown in FIG. 1. In such an arrangement, the maximum length of time in which the shutter blades are kept open is coercively limited to the order of ten seconds. In the circuitry shown in FIG. 1, the resistive elements for determining the time constant are formed by two independently functioning members, i.e., a photoconductive element $P_1$ and a fixed resistor $R_1$. Therefore, in the event that the object to be photographed is very bright and that accordingly, the photoconductive element $P_1$ shows a very small resistance value relative to that of the fixed resistor $R_1$, the presence of this latter resistor $R_1$ may be ignored. However, as the resistance value assumed by the photoconductive element $P_1$ increases in magnitude, the resulting composite resistance produced by the photoconductive element $P_1$ and the fixed resistor $R_1$ will be subjected gradually to the influence of the fixed resistor $R_1$. Such a mode of change in the resistance, in actual instance, will depict a languish curve on the low brightness side instead of forming an ideal curve (not shown) which represents the change in the exposure time or time constant and which theoretically should follow such a change in the resistance value of the photoconductive element as would take place in accordance with the change in the amount of light received by this element. In other words, as the intensity of brightness of the object to be photographed decreases, the tendency of the exposure time to become shortened relative to the predetermined required value will become intensified. Accordingly, there arises the inconvenience that the photograph taken will represent an under-exposure. After all, it may be said that, in FIG. 1, the defect which would occur due to prolonged exposure where the brightness of the object to be photographed is very low can be remedied. However, there arises a new defect, i.e., shortage of exposure in an photography where the object to be photographed is of an ordinary brightness.

Also, in order to eliminate unsuccessful photography due to camera-shake, there has been made a proposal to limit the exposure time of the camera. Such a limitation is utilized, in many cases, in flash photography. In such a case, the exposure time is limited to approximately 1/30 of a second.

In FIG. 2 which represents the circuitry of the prior art, such a limitation as described above is incorporated. The circuit of FIG. 2 is also illustrated in U.S. Pat. No. 3,500,729. More specifically, the arrangement shown in FIG. 2 is designed so that a time circuit which depends on the resistance value of the photoconductive element $P_2$ and another time circuit for regulating the camera-shake limits by the use of a variable resistor $R_2$ act upon a switching circuit substantially independently of each other. This independent action of these two time circuits upon the switching circuit should be understood to mean, as stated above, that in case the time constant or the exposure time which depends on the brightness of the object to be photographed is less than the length of time (approximately 1/30 second) which is the limit of camera-shake, the exposure time will be determined by the photoconductive element $P_2$, whereas, conversely, in case the photoconductive element $P_2$ gives a time constant which exceeds the camera-shake limit, the exposure time will be determined by the resistor $R_2$. This means a mode of action of the circuitry such that the output transistor $Tr_2$ is rendered "off" in accordance with the action of one of the two transistors $Tr_1$ and $Tr_3$ which is rendered "on" earlier than the other, so that no current is allowed to flow through the electromagnet $M_2$, causing the shutter blades to be closed.

In FIG. 2, the maximum exposure time is limited to a length as short as, for example 1/30 second, by the variable resistor $R_2$ and the capacitor $C_2$. An exposure which lasts for a length of time less than that limit, however, is determined by the photoconductive element $P_2$ and the capacitor $C_3$ depending on the intensity of brightness of the object to be photographed. In view of the fact, however, that there are provided two time circuits which function independently of each other, these two circuits require trigger switches $S_1$ and $S_3$, respectively, for the purpose of discharging the charges. It is, however, difficult from practical point of view to effect perfect synchronized actions of these two trigger switches. Let us now suppose that the trigger switch $S_2$ which is provided on the photoconductive element $P_2$ side functions properly with respect to its opening time and that the trigger switch $S_3$ which is provided on the variable resistor $R_2$ side opens with a delay relative to the former. Such a discrepancy in the function timing of these two trigger switches will lead to the inconvenience that the length of time (second) which represents the limit of camera-shake is unavoidably prolonged by the amount of said delay, and therefore, the idea of preventing camera-shake will lose its significance. Conversely, if the trigger switch $S_2$ opens earlier than the other, there will arise another inconvenience that the exposure time range which should be controlled depending on the intensity of brightness of the object to be photographed is narrowed. After all, it will be understood that the maximum exposure time, even in the arrangement in FIG. 2 also, should be limited to 1/30 second. However, this arrangement in FIG. 2 has the drawback that, in case the trigger switches $S_1$ and $S_2$ fail to function in synchronism relative to each other, there will arise a substantial error in photography even when the object being photographed is of an ordinary brightness.

SUMMARY OF THE INVENTION

It is, therefore, an object of the present invention to provide an exposure control circuitry in photographic cameras, which functions so that a potential having a level sufficient for the transistorized switching circuit to perform a switching action at the end of a certain length of time is supplied thereto by an auxiliary time circuit independently of the intensity of brightness of the object to be photographed.

Another object of the present invention is to provide an exposure control circuitry in photographic cameras, comprising an electric circuit arrangement which assures that the exposure time which is shorter than said certain length of time and which is adapted to be determined by a main time circuit containing a photoconductive element corresponds exactly to the intensity of brightness of the object to be photographed.

DESCRIPTION OF THE PREFERRED EMBODIMENT

Figure 1:
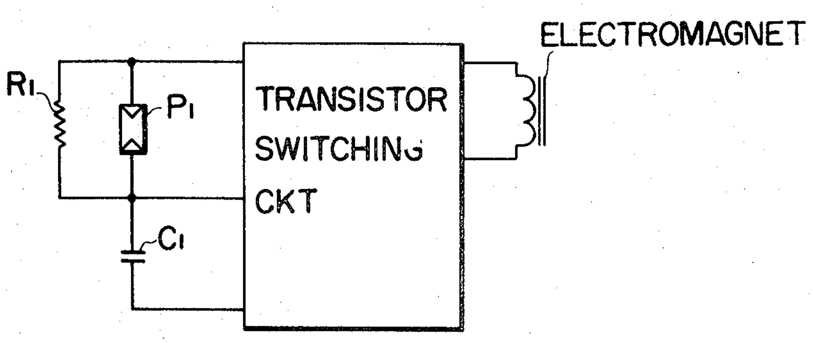
FIG. 1 is an example of electric circuitry of the prior art in which the time circuit in particular is shown concretely.
Figure 2:
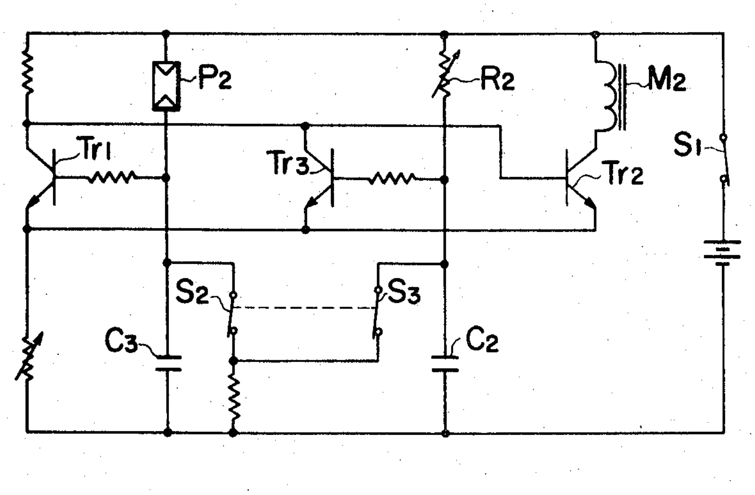
FIG. 2 is an electric circuitry showing another conventional technique and containing two time circuits.
Figure 3:
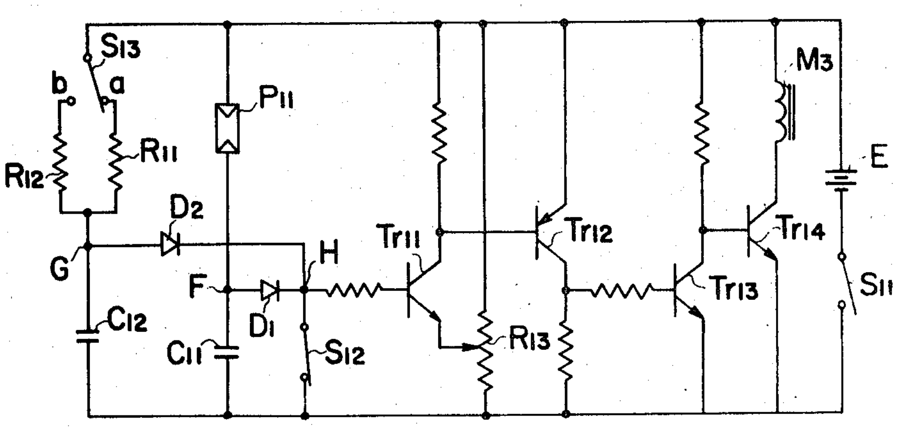
FIG. 3 is an electric circuitry showing an embodiment of the present invention.

In FIG. 3 which represents the present invention, the main time circuit comprises a photoconductive element $P_{11}$ such as Cds for detecting the brightness of the object to be photographed and a photometric or main capacitor $C_{11}$, whereas the auxiliary time circuit is composed of a resistor $R_{11}$ or $R_{12}$ and an auxiliary capacitor $C_{12}$. Let us now consider that the exposure control mechanism is operated by the action of the main time circuit alone, letting aside the action of the auxiliary time circuit. In such an instance, it should be understood that the transistorized switching circuit which is composed of transistors $Tr_{11}$, $Tr_{12}$, $Tr_{13}$ and $Tr_{14}$ is actuated by the potential of the juncture F of the photoconductive element $P_{11}$ and the main capacitor $C_{11}$.

More specifically, the power switch $S_{11}$ is closed first in sequence with the shutter release operation, and then the trigger switch $S_{12}$ is rendered open interlockingly with the opening action of the shutter blades. With this opening of the trigger switch $S_{12}$, the main capacitor $C_{11}$ is charged at a speed corresponding to the intensity of the brightness of the object to be photographed through the photoconductive element $P_{11}$ receiving the light coming from the object. When as a result of this charging, the potential of the juncture F gains the predetermined level, the transistor $Tr_{11}$ is rendered "on" via a diode $D_1$. As a consequence, the transistors $Tr_{12}$ and $Tr_{13}$ are also rendered "on." Whereas, the transistor $Tr_{14}$ is rendered "off," resulting in that the electromagnet $M_3$ which is connected to the collector electrode of the transistor $Tr_{14}$ is actuated to control the closing action of the shutter blades (which, in the instance of a focal plane shutter, means the starting of the rear curtain) which are not shown. In the drawing, $R_{13}$ represents a variable resistor for regulating the emitter potential of the transistor $Tr_{11}$. $D_1$ represents a diode connected — in the forward direction from the juncture F to the juncture H — between said juncture F and one H of the two input terminals of the transistorized switching circuit. This diode $D_1$ will have no particular significance from the viewpoint of action in case the presence of the aforesaid auxiliary time circuit is to be ignored.

On the other hand, in the auxiliary time circuit, arrangement is provided so that the connection can be switched over from the resistor $R_{11}$ to the resistor $R_{12}$ and vice versa by the changeover switch $S_{13}$. Said resistor $R_{11}$ serves to regulate the length of time in which the shutter blades are kept open, in such a way as to be long enough within the extent in which the transistorized switching circuit is allowed to function stably. In contrast to this, the resistor $R_{12}$ plays the role of regulating the maximum length of time in which the shutter blades are opened and closed, in such a way that it will fall within the length of time which is the limits of camera-shake. The changeover switch $S_{13}$ may be arranged so that not only its movable contact strip can be switched over manually from the contact a to the contact *b* whenever there is the fear for camera-shake, but also said movable contact strip may be switched over from the contact *a* to the contact *b* either manually when a flash device is used or interlockingly with the operation of attaching the flash device to the camera body. The juncture G between the first resistor $R_{11}$, the second resistor $R_{12}$ and the auxiliary capacitor $C_{12}$ is connected to one H of the two input terminals via the diode $D_2$.

Description will next be directed to the action of the exposure control circuitry as a whole which represents the combination of the action of the main time circuit and the action of the auxiliary time circuit. During the ordinary photography, the contact strip of the changeover switch or auxiliary switch $S_{13}$ is connected to the contact *a*, that is to say, to the first resistor $R_{11}$ side. This means that the main time circuit composed of the photoconductive element $P_{11}$ and the capacitor $C_{11}$ is in the state of being parallel with the auxiliary time circuit which comprises the first resistor $R_{11}$ and the capacitor $C_{12}$. By setting this first resistor $R_{11}$ so as to have a large resistance value, the time constant of said auxiliary time circuit can have a length of time of the order of 10 seconds as stated above. This length of time functions as the limit for regulating the maximum time in which the shutter blades are held open and closed.

Now, during the process of photography, the power switch $S_{11}$ is closed first. Whereupon, the transistor $Tr_{14}$ is rendered "on" whereby the electromagnet M is energized to lock the closing action of the shutter blades. Then, as the shutter blades (not shown) are opened, the trigger switch $S_{12}$ is opened interlockingly with the opening action of these shutter blades. Whereupon, the main as well as the auxiliary time circuits both begin time-counting independently of each other owing to their connections to the diodes $D_1$ and $D_2$, respectively. If the time constant of the photoconductive element $P_{11}$ side is smaller than the time constant of the auxiliary time circuit, it will be understood that the potential of the juncture F attains the switching level of the transistor $Tr_{11}$ earlier than does the potential at the juncture G. Accordingly, the said switching transistor $Tr_{11}$ is controlled (or rendered "on") with a time constant corresponding to the intensity of brightness of the object to be photographed. As a consequence, the transistors $Tr_{12}$ and $Tr_{13}$ are both rendered "on" while the output transistor $Tr_{14}$ is rendered "off," causing the electromagnet M to be de-energized to release said locking. As a result, the shutter blades are closed, and thus, a single exposure is completed.

On the other hand, if, due to the low brightness condition of the object to be photographed, the time constant of the main time circuit is greater in value than the time constant of the auxiliary time circuit, the potential at the juncture G will reach the switching level of the transistor $Tr_{11}$ earlier than the potential at the juncture F. Accordingly, the shutter blades are coercively closed with a time length which is determined by the time constant of the auxiliary time circuit, without depending on the intensity of brightness of the object to be photographed.

Furthermore, it will be understood that the auxiliary switch $S_{13}$ is caused to be connected to the contact *b* side interlockingly with the operation of attaching a flash device to the camera body. In this instance, the auxiliary time circuit which is connected in parallel with the main time circuit is rendered capable of regulating the maximum time length of the opening and closing of the shutter blades to the length of time, for example 1/30 second, which is the limit of camera-shake.

When it is intended to perform a flash photography, it will be understood that, during the process of such a photography, the flash device (not shown) will first luminesce, followed by the opening of the shutter blades and also by the opening of the trigger switch $S_{12}$. Where the time constant of the main time circuit — which has undergone a change in accordance with the light reflected from the object to be photographed when it is exposed to said luminescence — is smaller than the time constant (1/30 second) of the auxiliary time circuit, the shutter blades are closed with a time constant of the main time circuit which corresponds to the intensity of brightness of the object to be photographed. This means that the so-called automatic flash photography is conducted. On the other hand, where the time constant of the main time circuit remains to be greater than that of the auxiliary time circuit when the photoconductive element $P_{11}$ is exposed to the flash light, the shutter blades are coercively closed with a length of time ( 1/30 second) which is the limit of camera-shake, by virtue of time constant of the auxiliary time circuit.

In FIG. 3 which represents the present invention, the junctures F and G of the main as well as the auxiliary time circuits are connected, via the diodes $D_1$ and $D_2$, respectively, to one H of the two input terminals of the transistorized switching circuit. Accordingly, the charges of the capacitors $C_{11}$ and $C_{12}$ are both discharged through the trigger switch $S_{12}$, so that their potentials are held zero so long as the trigger switch $S_{12}$ is closed. Upon the opening of the trigger switch $S_{12}$, these two capacitors $C_{11}$ and $C_{12}$ simultaneously start the storing of charge. In other words, the main as well as the auxiliary time circuits simultaneously being counting time at the moment at which the trigger switch $S_{12}$ is opened.

Also, in the auxiliary time circuit shown in FIG. 3, when either one of the maximum length of exposure time and the limit time of camera-shake is required, it is only necessary to connect a single resistor between the juncture G and the positive pole of the power source in place of the provision of the auxiliary switch $S_{13}$, the first resistor $R_{11}$ and the second resistor $R_{12}$.

The present invention is not limited to only the above-described embodiments, but it should be understood that many changes and modifications may be made by those skilled in the art without departing from the spirit of the invention.

We claim:

1. An exposure control circuitry in photographic cameras, comprising a main time circuit composed of a serial circuit formed with a photoconductive element and a main capacitor, a transistorized switching circuit and an electromagnetic connected to an output terminal of said switching circuit for controlling the closing action of the shutter blades, said exposure control circuitry comprising:

a first diode inserted between the juncture F of said photoconductive element and said main capacitor and one H of the input terminals of said switching circuit in such a way that said diode is arranged in the forward direction from said juncture F to said one H of the input terminals, an auxiliary time circuit comprising a serial connection of a resistor and an auxiliary capacitor and being connected in parallel with said main time circuit, and actuating said switching circuit in the case where the charge voltage of said main capacitor fails to gain the magnitude sufficient for actuating said switching circuit, and a second diode inserted between the juncture G of said resistor and said auxiliary capacitor and said one H of the input terminals of said switching circuit in such a way that this diode is arranged in the forward direction from said juncture G to said one H of the input terminals.

2. An exposure control circuitry according to claim 1, in which said circuitry further comprises another resistor arranged in parallel with said resistor in said auxiliary circuit for regulating the limit of camera-shake, and an auxiliary switch capable of selecting its connection to either one of these two resistors.

3. An exposure control circuitry according to claim 1, in which a trigger switch is connected between said one H of the input terminals and one of the poles of the power source.

4. An exposure control circuitry according to claim 2, in which a trigger switch is connected between said one H of the input terminals and one of the poles of the power source.

* * * * *